Oct. 22, 1963   K. B. ZIFFERER ET AL   3,107,570
FASTENING DEVICE
Filed Oct. 11, 1961
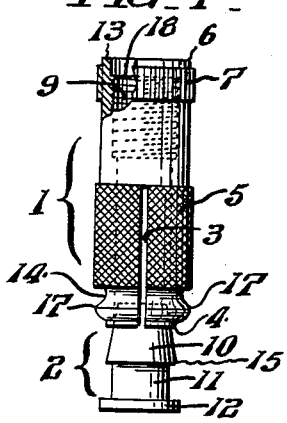
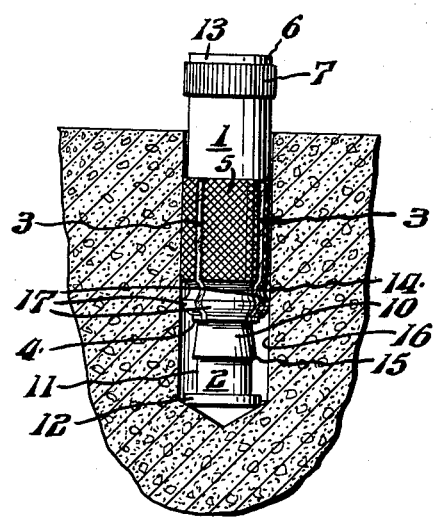
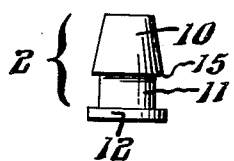
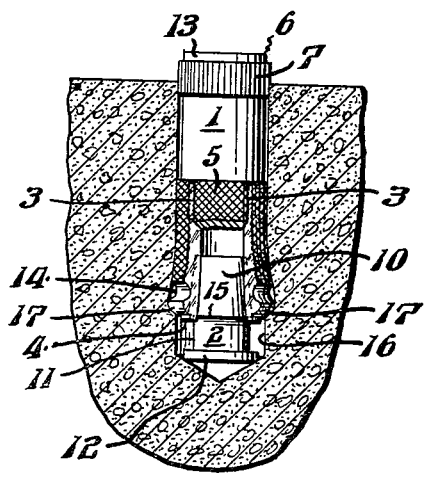
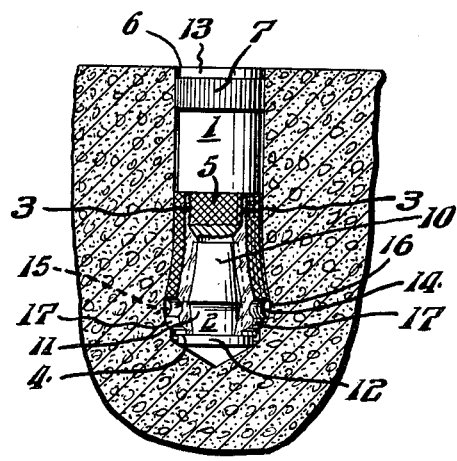
INVENTORS.
Bernard Coleman, Edward G. Renoll,
Walter L. Sechrist & Kenneth B. Zifferer,
BY Paul & Paul
ATTORNEYS.

3,107,570
FASTENING DEVICE
Kenneth B. Zifferer, Walter L. Sechrist, and Edward G. Renoll, York, Pa., and Bernard Coleman, Westminster, Md., assignors to U.S. Expansion Bolt Company, York, Pa., a corporation of Pennsylvania
Filed Oct. 11, 1961, Ser. No. 144,430
2 Claims. (Cl. 85—2.4)

This invention relates to a fastening device, more specifically it is concerned with a fastening device for securing objects such as brackets and panels to masonry floors and walls. The fastening device has a tubular shell or anchoring component adapted to be inserted into a pre-drilled hole in the masonry and then circumferentially expanded by a tapered plug, with the anchoring component being internally threaded for receiving a threaded bolt or the like by which the secured objects are fastened to the masonry floors or walls.

It is an important object of this invention to provide a structure wherein the tubular shell locks onto the tapered plug when the shell is fully driven into the hole and expanded, so that the two components are rigidly held together to withstand vibration or other forces.

It is another object of our invention to provide, in connection with the fastening device of the type referred to, a simple and reliable means by which the tapered expander plug and the tubular shell are held assembled for assurance against detachment and loss until the device is ready to be used.

It is another object of our invention to provide a tubular component with an exterior surface which will hold the fastening device finger tight in pre-drilled holes before expansion of the shell, and with such a surface that will prevent the shell from turning when a bracket or panel bolt is threaded into it. Other objects and attendant advantages will appear from the following detailed description from the attached drawings wherein:

FIG. 1 is a view, partly in elevation and partly in section, of a fastening device embodying the invention.

FIG. 2 is a view in elevation of the expander plug.

FIG. 3 is a view partly in elevation and partly in section, showing the fastening device as placed in the pre-drilled hole.

FIG. 4 is a view, partly in elevation and partly in section, of the fastening device after the shell component has been hammered part way down onto the expander plug.

FIG. 5 is a view, partly in elevation and partly in section, showing the expander pin fully within the tubular element and the shell fingers within the plug recess.

With more detailed reference, referring first to FIGS. 1 and 2 of the drawing, the fastening device of this invention comprises a tubular shell 1, which is formed from a relatively soft metal, and a tapered expander plug 2 of harder metal. The rear end portion 4 of the tubular shell 1 is longitudinally slitted at circumferential intervals, as at 3, forming shell fingers 17, and its internal surface is smoothly cylindric while its outer surface is coarsely rough, preferably diamond knurled, as at 5. The knurled surface serves to grip more firmly the surfaces 16 of the masonry hole and to prevent the shell from turning and loosening in the hole when the bolt is later inserted. The opposite or front end portion of the shell 6, has vertical knurls as at 7, a small projecting outer lip 13, and recessed internal threads 9. The internal threads 9, for receiving a bolt for securing fixtures, extend from the front recess portion 18 to a point which is slightly more than one-third of the length of the entire shell, thereby allowing for a "safety-zone" between the threads and the top of the expander plug. The outer lip 13 protects the threads when the shell is hammered into the hole and over the expander plug. The "safety-zone," described as existing between the termination of the threads and the top of the fully inserted plug, assures that the threaded bolt will not touch or push out the plug and thus reduce the grip of the expanded shell fingers 17 on the walls of the hole.

The expander plug 2 has a tapered leading portion 10, a shoulder 15, a cylindrical recess portion 11, and a bottom flange 12. As shown in FIG. 1, the pin 2 is inserted small end first into the rear end portion of the shell, and under slight pressure the shell's slitted ends expand. The shell fingers 17, i.e., the segments of the shell separated by the longitudinal slits 3, grasp and hold the tapered portion 10 of the plug with a firm pressure which can be overcome if necessary without breaking the shell. The plug 2 is thus held detachably assembled with the tubular shell component and prevented from slipping out and being lost.

The tubular shell is also fabricated with a relief groove or recess 14 to assure the easy flow of the shell over the shoulder 15 or point of widest diameter of the tapered portion of the expander plug. When the expander plug has been driven into the shell so that the lower end of the shell fingers slip over the shoulder 15 of the expander plug and then into the cylindrical recess portion 11, the two elements become rigidly attached so that vibration forces cannot overcome the bond.

The fastening device as disclosed in this application is simply operated as follows. After a hole of suitable diameter is bored in the masonry 16, as shown in FIGS. 3–5, the fastening device assembled as in FIG. 1 is placed in the hole. As the expander pin is fitted with a bottom flange 12 it quickly acquires a proper seating so that the plug can penetrate into the shell for its entire length. As the front end of the shell, and more particularly the outer lip 13, is pushed or hammered the shell is driven down upon the expander plug 2. The slit end 4 of the shell is circumferentially expanded during the advance of the shell, as shown in FIG. 4, until the ends of the shell fingers 17 and the relief groove 14 slip over the shoulder 15 of the plug and come to rest in the recessed portion 11 and against the bottom flange 12 (FIG. 5). As the shell fingers are expanded and dig into the sides of the hole, the rough diamond knurled surface 5 of the shell and fingers bite into the masonry to prevent the subsequent displacement of the device and to lock against any rotary movement. The shell then grips the hole at two points. One gripping point is at the location where the shell fingers begin to flare out by reason of the plug, toward the middle of the shell. The second gripping point is at that point where the shell flows over the plug shoulder, at the bottom of the shell.

In the construction of the fastening device as described above other advantages are inherent. The threads are recessed in the front end portion of the shell so as to avoid damaging them during installation. In addition, the exterior surface of this portion of the shell is fluted, or provided with vertical knurls, so that installation hammering will not enlarge the outside or inside diameter of the shell at this point. This fluted surface construction also acts to prevent the shell from becoming loose or revolving at the surface of the masonry. The diamond knurled construction 5, shown as covering the rear end portion of the shell, acts to hold the shell in the hole when it is first inserted, and, then later, when the shell fingers are expanded, the diamond knurls grip the hole sides. This rough surface is very useful in overhead applications and compensates for hole variations resulting from inconsistent drilling. The longitudinal slits 3 are cut entirely through the shell sides so as to allow for even and complete expansion.

The pre-assembled construction as described above eliminates lost plugs and the possibilty of the plug dropping free into the hole ahead of the shell. The shell fingers grip the surface of the tapered plug with sufficient strength to hold the components securely together. With this simple construction there is no need for grooves or projections in the shell or plug to hold the units assembled. The shell relief groove 14 cooperates with the plug shoulder 15 and plug cylindrical recess 11 to effectively bind the shell and plug after the plug has fully expanded the shell. The softer metal of the shell with the advantage of thinner metal thickness at the relief groove allow the shell fingers to slip over the plug shoulder and then spring inwardly into the plug recess. This construction offers a strong gripping means between the components so as to withstand vibration and shock loads which would loosen the ordinary, straight tapered plug from its shell component.

The fastening device as described has operational advantages in that it requires only two operations for installation, namely, drilling and fitting while the self-drilling anchors require many more steps in installation. In addition the above described device can be set below the surface of the masonry and function with greater gripping power while the self-drilling anchors cannot be deep-set.

While in accordance with the provision of the statutes, we have illustrated and described the best embodiment of our invention; it will be apparent to those skilled in the art that changes may be made in the form of the apparatus described without departing from the spirit of the invention as set forth in the appended claims.

Having thus described our invention we claim the following:

1. A masonry fastening device adapted for insertion into a pre-drilled hole in masonry comprising a tubular shell and a tapered expander pin; the tubular shell having an axial bore of substantially uniform diameter extending the entire length of the shell and a slitted end portion located adjacent the first inserted end of the shell, said portion having a plurality of slits at circumferential intervals running longitudinally forward from the first inserted end of the shell, the outer circumferential surface of the slitted portion being knurled and having an annular groove positioned in proximity to the slitted end, a series of internal threads located within the bore of the shell, said threads recessed from the last inserted end of the shell and extending inwardly not more than one-half the entire length of the shell; the tapered expander plug adapted to be inserted small end first into the bore of the tubular shell at the slitted end, said plug having a tapered portion with a major diameter larger than the diameter of the shell bore and a recessed portion with a diameter less than the major diameter of the tapered portion, said recessed portion having a longitudinal length of approximately one-third the length of the plug, said recessed portion being located adjacent to the larger end of said tapered portion and an enlarged flange located at the end of the tapered plug opposite to the first inserted end whereby upon full insertion of the plug into the shell the expanded end portion of the shell flows around the point of major diameter of the tapered portion of the plug and into the recessed portion thereby locking the shell and plug together.

2. A masonry fastening device adapted for insertion into a pre-drilled hole in masonry comprising a tubular shell and a tapered expander pin; the tubular shell having an axial bore of substantially uniform diameter extending the entire length of the shell and a slitted end portion located adjacent the first inserted end of the shell, said portion having a plurality of slits at circumferential intervals running longitudinally forward from the first inserted end of the shell, the outer circumferential surface of the slitted portion being knurled and having an annular groove positioned in proximity to the slitted end, a series of internal threads located within the bore of the shell, said threads recessed from the last inserted end of the shell and extending inwardly not more than one-half of the entire length of the shell, an annular projecting lip located at the last inserted end of the shell and a fluted portion arranged on the outer circumferential surface of the shell adjacent the last inserted end; the tapered expander plug adapted to be inserted small end first into the bore if the tubular shell at the slitted end, said plug having a tapered portion with a major diameter larger than the diameter of the shell bore and a cylindrical recessed portion with a diameter less than the major diameter of the tapered portion, said recessed portion having a longitudinal length of approximately one-third the length of the plug and said portion being located adjacent to the larger end of said tapered plug and an enlarged flange located at the end of the tapered plug opposite to the first inserted end whereby upon full insertion of the plug into the shell, the expanded end portion of the shell flows around the point of major diameter of the tapered portion of the plug and into the recessed portion thereby locking the shell and plug together.

References Cited in the file of this patent

UNITED STATES PATENTS

| | | |
|---|---|---|
| 1,107,544 | Ogden | Aug. 18, 1914 |
| 1,164,322 | Yeatman | Dec. 14, 1915 |
| 1,996,121 | Phillips | Apr. 2, 1935 |
| 2,302,590 | Waite | Nov. 17, 1942 |
| 2,313,522 | Dinnes | Mar. 9, 1943 |
| 2,544,304 | Eckenbeck et al. | Mar. 6, 1951 |
| 2,765,697 | Brush | Oct. 9, 1956 |
| 2,870,666 | Dempsey | Jan. 27, 1959 |
| 2,876,485 | Cowles | Mar. 10, 1959 |
| 2,900,863 | Maynard | Aug. 26, 1959 |
| 2,941,439 | Rapata | June 21, 1960 |